United States Patent
He et al.

(10) Patent No.: US 9,399,524 B2
(45) Date of Patent: Jul. 26, 2016

(54) SYSTEM AND METHOD FOR DISPLAYING RUNWAY LANDING INFORMATION

(71) Applicant: HONEYWELL INTERNATIONAL INC., Morristown, NJ (US)

(72) Inventors: Gang He, Morristown, NJ (US); Steve Johnson, North Bend, WA (US); Thea L Feyereisen, Hudson, WI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/519,741

(22) Filed: Oct. 21, 2014

(65) Prior Publication Data

US 2016/0107766 A1  Apr. 21, 2016

(51) Int. Cl.
*G05D 1/00* (2006.01)
*B64D 45/08* (2006.01)
*G01C 23/00* (2006.01)
*B64D 45/00* (2006.01)

(52) U.S. Cl.
CPC ............ *B64D 45/08* (2013.01); *G01C 23/00* (2013.01); *B64D 2045/008* (2013.01)

(58) Field of Classification Search
CPC ............ G08G 5/02; G01C 21/00; G05D 1/06
USPC .................................. 701/7, 3, 5, 14, 16, 18
See application file for complete search history.

(56) References Cited

U.S. PATENT DOCUMENTS

| | | |
|---|---|---|
| 4,368,517 A | 1/1983 | Lovering |
| 5,353,022 A | 10/1994 | Middleton et al. |
| 8,560,150 B1 | 10/2013 | Phillips et al. |
| 8,774,989 B1 * | 7/2014 | Bush et al. ............ 701/14 |
| 2004/0044446 A1 | 3/2004 | Staggs |
| 2008/0012729 A1 | 1/2008 | Constans |
| 2008/0234882 A1 | 9/2008 | Villaume et al. |
| 2010/0036551 A1 | 2/2010 | Lacaze et al. |
| 2013/0278444 A1 | 10/2013 | Venkataswamy et al. |
| 2014/0257601 A1 | 9/2014 | Horne et al. |
| 2015/0127196 A1 * | 5/2015 | Ishihara et al. ............ 701/16 |

FOREIGN PATENT DOCUMENTS

EP  1016851 B1  8/2003

OTHER PUBLICATIONS

Extended EP search report for Application No. 15190471.1-1557 dated Feb. 17, 2016.

* cited by examiner

*Primary Examiner* — Thomas G Black
(74) *Attorney, Agent, or Firm* — Ingrassia Fisher & Lorenz, P.C.

(57) ABSTRACT

A system and method are disclosed for indicating to an aircrew of an aircraft a normalized runway icon to ensure visualization of a predicted touchdown point, runway length, stopping distance, energy state marking, and threat conditions, where normalization is referenced to typically available length for landing. Indications of present aircraft locations relative to the icons as well as alerts when thresholds are exceeded are provided.

17 Claims, 6 Drawing Sheets

SYSTEM AND METHOD FOR DISPLAYING RUNWAY LANDING INFORMATION

TECHNICAL FIELD

The present invention generally relates to a system for improving a pilot's ability to complete a landing on a runway, and more particularly to a system for displaying information to support a pilot's ability to fly the landing within desired parameters.

BACKGROUND

The approach to landing and touch down on the runway of an aircraft can be a challenging task. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway.

When using a typical navigation map display to indicate approach landing state, depending on the current display scale settings and phase of approach, the runway icon can very small and not suitable to display the relevant landing state information such predicted touch down point and the predicted stopping point. As such, an iconized, dedicated runway display for indicating current landing state is best suitable for timely and unambiguous information to flight crews.

Aircraft must be in correct configurations or energy state to complete an effective landing. Clear and unambiguous information to flight crews about the present and predicted energy state are critical for flight crews to make adjustment or decisions. Integration of this type of information into traditional moving map displays has several draw backs: (1) In aircraft centered display mode typically used for final approach segment, the runway symbol could be very small and cannot provide clear indication of the energy state information; (2) When using a moving map display, the airport and runway objects are typically shown to scale in order to accommodate other necessary navigation and traffic objects on the map. The scaling necessary for a moving map can also make the proper display of energy state information difficult to visualize for flight crews during the critical time period.

Accordingly, it is desirable to provide a system and method for improving the ability to fly stabilized landings including displaying information supporting a pilot's ability to fly the landings. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for displaying information allowing a pilot to fly a stabilized approach to landing.

In an exemplary embodiment, a system for assisting a pilot of an aircraft to perform a stable landing, the system comprising a processor configured to determine an aircraft energy state of the aircraft; and a display responsive to the processor and configured to display a first symbol resembling a runway; display a second symbol indicating a length of the runway or runway length remaining; display a third symbol associated with the first symbol indicating where the aircraft would touch down when landing at the aircraft energy state determined by the processor; display a fourth symbol having a first format and associated with the first symbol indicating where the aircraft would be able to stop based on the aircraft energy state and a assumed braking performance; and if the aircraft is on the ground, display a fifth symbol associated with the first symbol indicating the current location of the aircraft on the runway; and display a sixth symbol associated with the first symbol indicating where the aircraft would be able to stop based on the aircraft energy state and current braking performance.

In another exemplary embodiment, a system for assisting a pilot of an aircraft to perform a stable landing, the system comprising a database configured to store information about a runway including a length thereof; a processor coupled to the database and configured to determine an aircraft energy state of the aircraft; determine a position of the aircraft in relation to the runway; determine a stopping distance of the aircraft when landing on the runway based on the aircraft energy state and a assumed braking performance; determine a stopping distance of the aircraft when landing on the runway based on the aircraft energy state and current braking performance; and a display responsive to the processor and configured to display a first symbol resembling the runway; display a second symbol indicating the length of the runway or runway length remaining; display a third symbol associated with the first symbol indicating where the aircraft would touch down when landing at the aircraft energy state determined by the processor; display a fourth symbol having a first format and associated with the first symbol indicating where the aircraft would be able to stop based on the aircraft energy state and assumed braking performance; and display a fifth symbol associated with the first symbol indicating the current location of the aircraft on the runway; and display a sixth symbol associated with the first symbol indicating where the aircraft would be able to stop based on the aircraft energy state and current braking performance.

In yet another exemplary embodiment, a method for assisting a pilot of an aircraft to fly a stable landing, comprising determining via a processor an aircraft energy state of the aircraft; displaying via a display a first symbol resembling a runway; displaying via the display a second symbol indicating a length of the runway or runway length remaining; displaying via the display a third symbol associated with the first symbol indicating where the aircraft would touch down when landing at the aircraft energy state; displaying via the display a fourth symbol having a first format and associated with the first symbol indicating where the aircraft would be able to stop based on the aircraft energy state and assumed braking performance; displaying via the display a fifth symbol associated with the first symbol indicating the current location of the aircraft on the runway; and displaying via the display a sixth symbol associated with the first symbol indicating where the aircraft would be able to stop based on the aircraft energy state and current braking performance.

BRIEF DESCRIPTION OF THE DRAWINGS

The present invention will hereinafter be described in conjunction with the following drawing figures, wherein like numerals denote like elements.

During the course of this description, like numbers may be used to identify like elements according to the different figures that illustrate the various exemplary embodiments.

DETAILED DESCRIPTION

Figure 1:
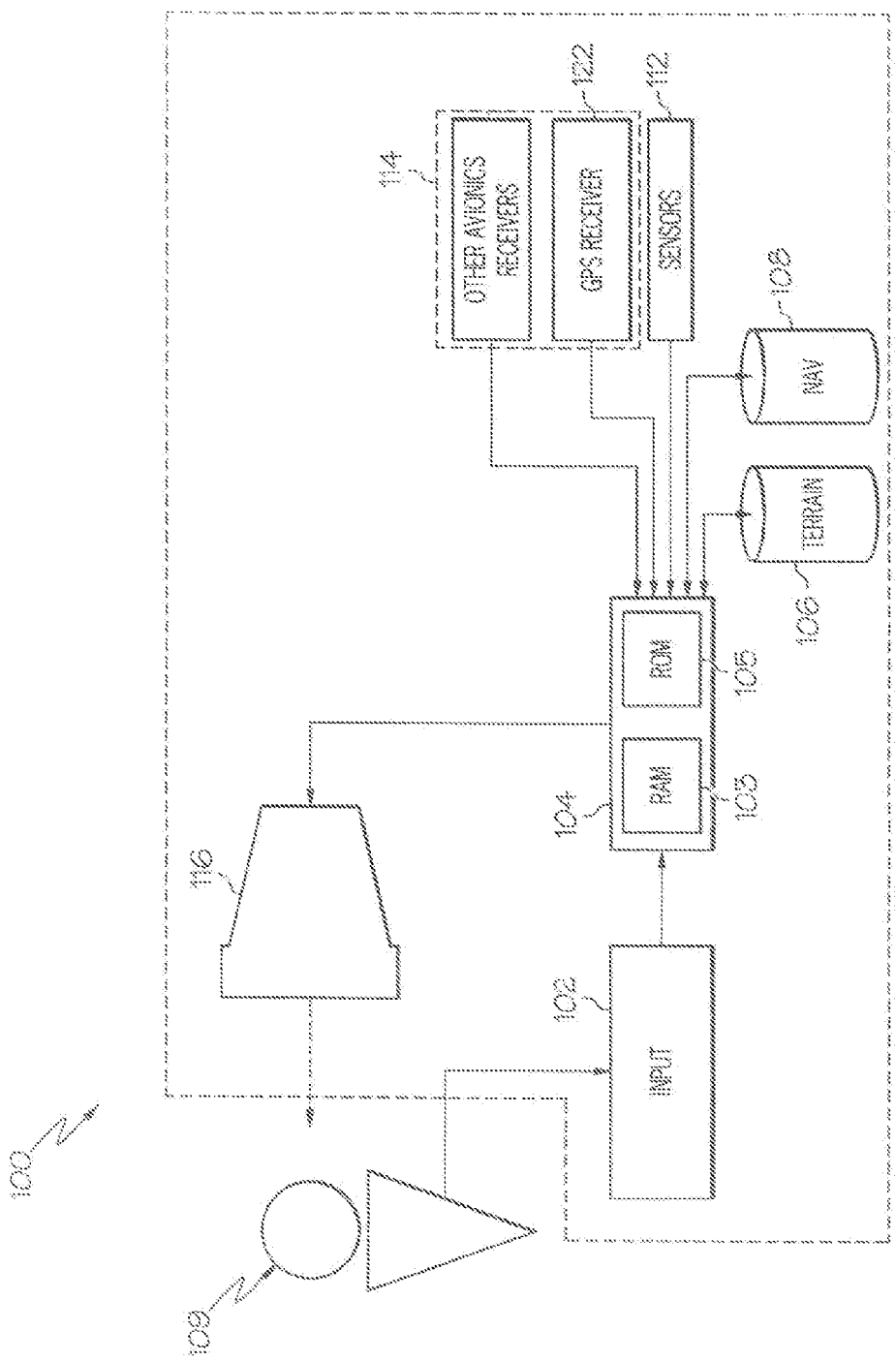
FIG. 1 is a block diagram of an aircraft display system for generating images in accordance with exemplary embodiments.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection whir the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a. DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Although embodiments described herein are specific to aircraft display systems, it should be recognized that principles of the inventive subject matter may be applied to other vehicle display systems.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Alternate embodiments of the present invention to those described below may utilize whatever navigation system signals are available, for example a ground based navigational system, a GPS navigation aid, a flight management system, and an inertial navigation system, to dynamically calibrate and determine a precise course.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues (e.g., waypoint symbols, line segments interconnecting the waypoint symbols, range rings) and nearby environmental features (e.g., terrain, weather conditions, political boundaries).

In accordance with the exemplary embodiments, a system and method are described for indicating to an aircrew (1) display elements that provides awareness of the ability to complete a landing within parameters based on the differences between current energy state and desired energy state. (2) A dedicated iconized display representing the runway environment is used to place relevant approach state information. More specifically, an icon and symbology based landing runway environment may be displayed on a primary flight display (PFD), in a dedicated window on a multi-function display (MFD), or an electronic flight bag (EFB). The icon may include the following elements: (1) A normalized runway icon to ensure visualization of distance marking, energy state marking, and threat conditions, where normalization is referenced to typically available length for landing; (2) energy cues or symbology relative to the normalized icons with the indications of distances, markings, and threat conditions; (3) indications of present aircraft locations relative to the icons; (4) dynamic format change and layering of the energy cues. For example, if the predicted touch down point is too far down the runway, the icon for the touchdown point will change color and size, and is brought to the top layer; (5) coordinated caution and/or warning messages to the energy state icons. Messages such as short runway may be displayed in addition to a stopping distance symbol. An aural annunciation may also accompany the visual caution and/or warning message.

The 2D icon runway display becomes available when in final approach configurations. The dedicated icon display can be fade onto a dedicated area of PFD or a dedicated window within a MFD or EFB displays in order to show the relevant information for landing and take-off conditions. When a warning condition is issued, for example, GO AROUND caused by unstable approach conditions, both 2D runway borders and predicted stopping point symbology will change format, for example, become red, to bring attention to flight crews of such conditions associated with the approach runway. In some situations, certain symbology such as indication for increased or maximum braking efforts and deceleration indications may be brought to the top of the displayed elements with changing colors to indicate the required actions.

Referring to FIG. 1, an exemplary flight deck display system 100 is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) (not shown), such as a mouse, a trackball, or joystick, and/or a keyboard, one or more buttons, switches, or knobs. In the depicted embodiment, the user interface 102 includes a CCD and a keyboard (not shown). The user 109 uses the CCD to, among other things, move a cursor symbol on the display screen (see FIG. 2), and may use the keyboard to, among other things, input textual data. It should be understood that several of the blocks described as part of the flight deck display system 100 are optional and not required for the exemplary embodiments, including the input device 102, the terrain database 106, the navigation database 108, and sensors 112, for example.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only a global position system (GPS) receiver 122 is depicted in FIG. 1, and will now be briefly described.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In operation, the display system 100 is also configured to process the current flight status data for the host aircraft 206. In this regard, the sources 106, 108, 112, 114 of flight status data generate, measure, and/or provide different types of data related to the operational status of the host aircraft 206, the environment in which the host aircraft 206 is operating, flight parameters, and the like. In practice, the sources 106, 108, 112, 114 of flight status data may be realized using line replaceable units (LRUs), transducers, accelerometers, instruments, sensors, and other well-known devices. The data provided by the sources 106, 108, 112, 114 of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process data obtained from the sources 106, 108, 112, 114 of flight status data in the manner described in more detail herein. In particular, the display system 100 can use the flight status data of the host aircraft when rendering the ITP display.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft will include numerous other devices and components for providing additional functions and features, as will be appreciated in the art.

Figure 2:
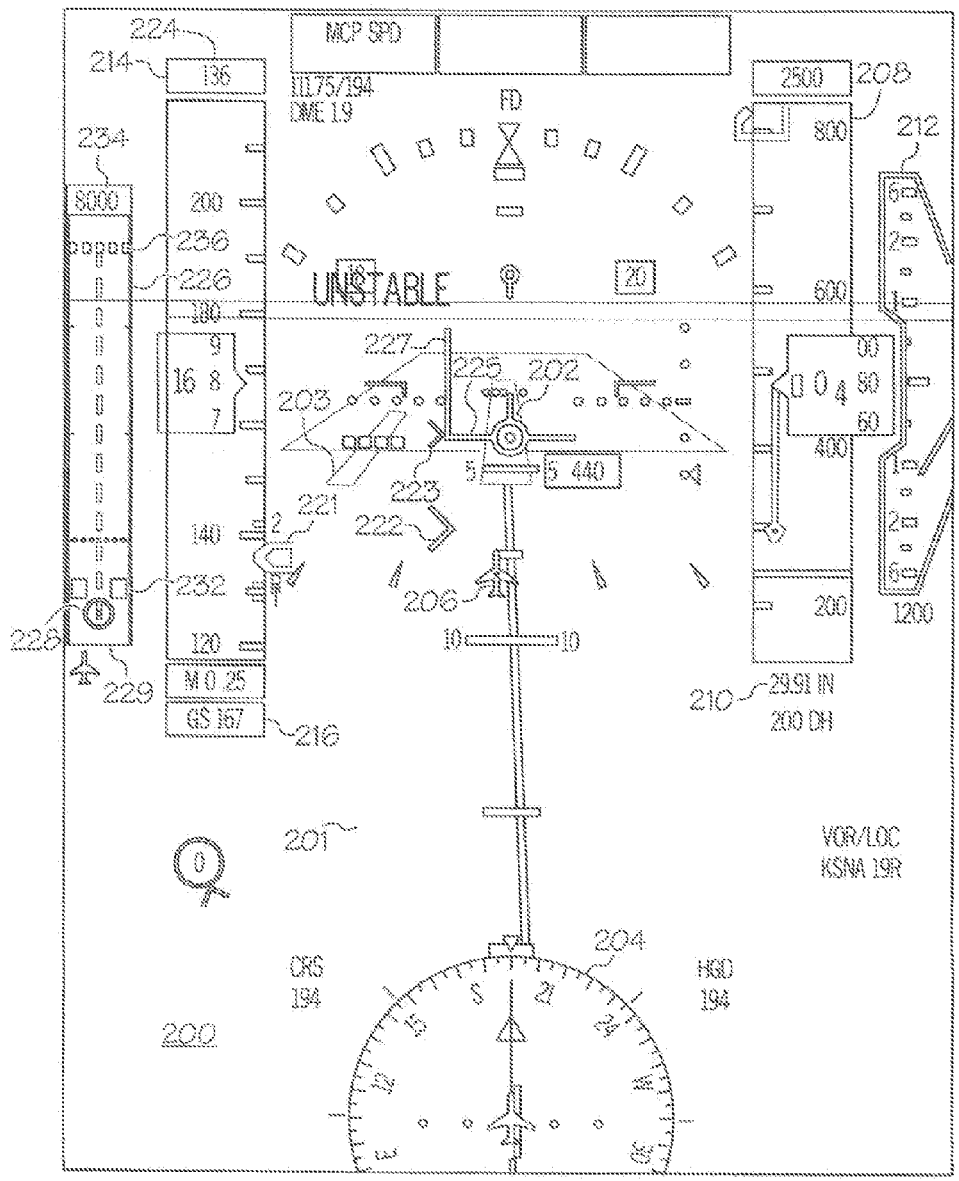
FIGS. 2-5 are exemplary display screens presented to the crew of the aircraft in accordance with an exemplary embodiment.

Referring to FIG. 2, textual, graphical, and/or iconic information rendered by the display device 116, in response to appropriate display commands from the processor 104 is depicted, preferably as a three-dimensional perspective view, and is created from pre-stored database information and flight management data, e.g., heading, altitude, and speed, superimposed on a synthetic rendering of terrain 201 and objects such as a runway 202 and a taxiway 203. More specifically, the displayed representation 200 of an aircraft 206 approach to landing includes, a compass 204, and various other data including an altimeter 208, a barometric pressure setting indicator 210, a vertical feet-per-minute indicator 212, an airspeed indicator 214, a ground speed indicator 216, and various other information known to those skilled in the art. A flight path marker 225 is typically a circle with horizontal lines (representing wings) extending on both sides therefrom, a vertical line 227 (representing a rudder) extending upwards therefrom, and indicates where the plane is "aimed" during normal flight. Additional data (not shown) could also be displayed, and some of those indicators shown could be omitted.

In accordance with the exemplary embodiments, an aircraft energy state is determined from a plurality of flight parameters including airspeed, groundspeed, altitude above the runway, distance to the runway, aircraft configuration, and engine power settings. The aircraft energy state is then compared with a desired stable approach energy state. A calculation is then made for required rates of airspeed and vertical speed adjustments, based on the airframe parameters, in order to correct the aircraft energy state to that of the desired state. That required adjustment rates to various parameters are then converted into a desired deceleration or acceleration indicator along the flight path direction as a first icon, e.g., the chevron 222. Flight crews can then adjust aircraft configurations, engine power setting, etc. such that the instantaneous acceleration chevron 223 can be gradually overlapping with the desired acceleration chevron 222. A target airspeed 221 is indicated on the airspeed indicator 214, and optionally may also be displayed digitally as numbers 224.

Furthermore, in accordance with the exemplary embodiments for landing operations, a symbol 226 representing the runway 202 is displayed on the display 200, having a symbol 228, e.g., a circle, representing where the aircraft would touchdown on the runway 202 if the current energy state were maintained. The symbol 232 represents a desired touchdown point, and the number 234 at the end of the runway indicate the runway length. The symbol 236, e.g. a series of rectangles, indicates where the aircraft should be able to stop in view of the touchdown point 228, energy state of the aircraft, and an assumed braking performance. Assumed braking performance includes the assumed braking action applied, i.e., maximum manual braking or autobraking setting as well as the assumed runway surface conditions. In this descriptive example, the touchdown symbol 228 is near the threshold 229, resulting in a distance sufficient to stop the plane on the runway 202. The format of the symbol 236 preferably would be such, e.g., green, that would indicate the stopping distance is within a safety margin.

Figure 3:
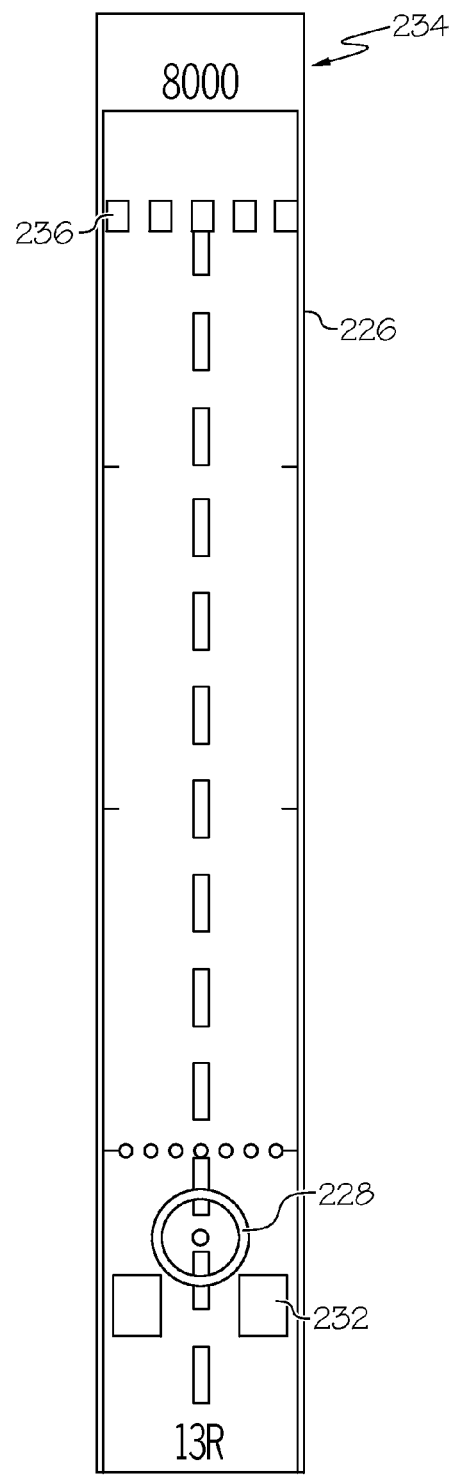

In the descriptive example of FIG. 3, the touchdown symbol 228 is beyond the threshold 232, resulting in a reduced distance to stop the aircraft on the runway 202. The format of the symbol 236 preferably would be such, e.g., yellow, that would indicate the stopping distance is marginal.

Figure 4:
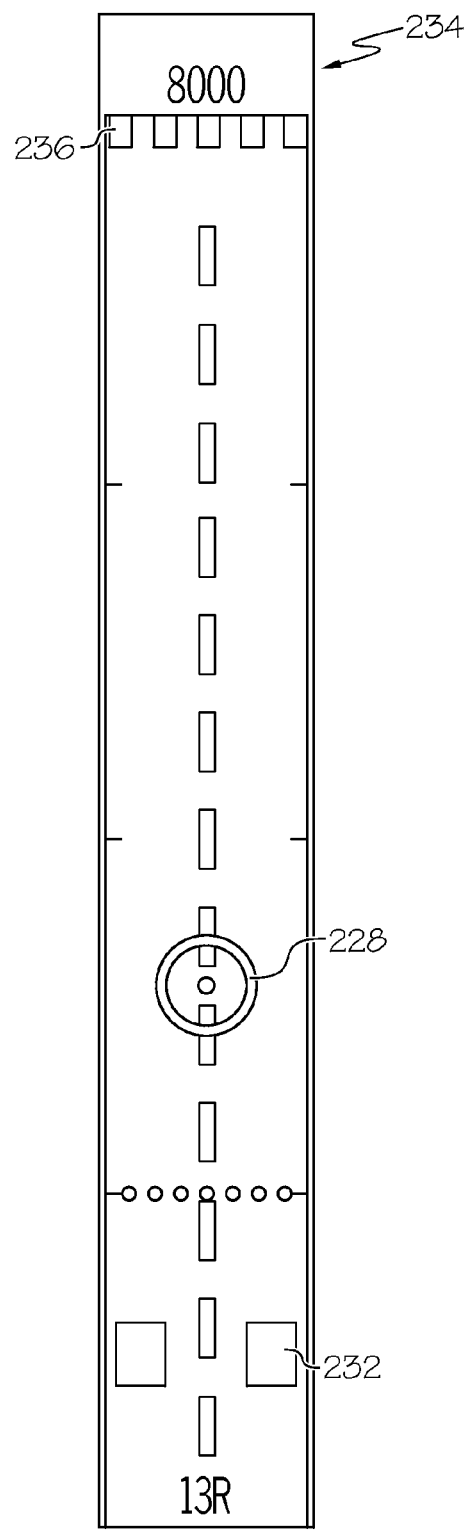

Referring to FIG. 4, the touchdown symbol 228 is well beyond the threshold 232, resulting in insufficient distance to stop the aircraft on the runway 202. The format of the symbol 236 preferably would be such, e.g., red, which would indicate the stopping distance is not sufficient.

Figure 5:
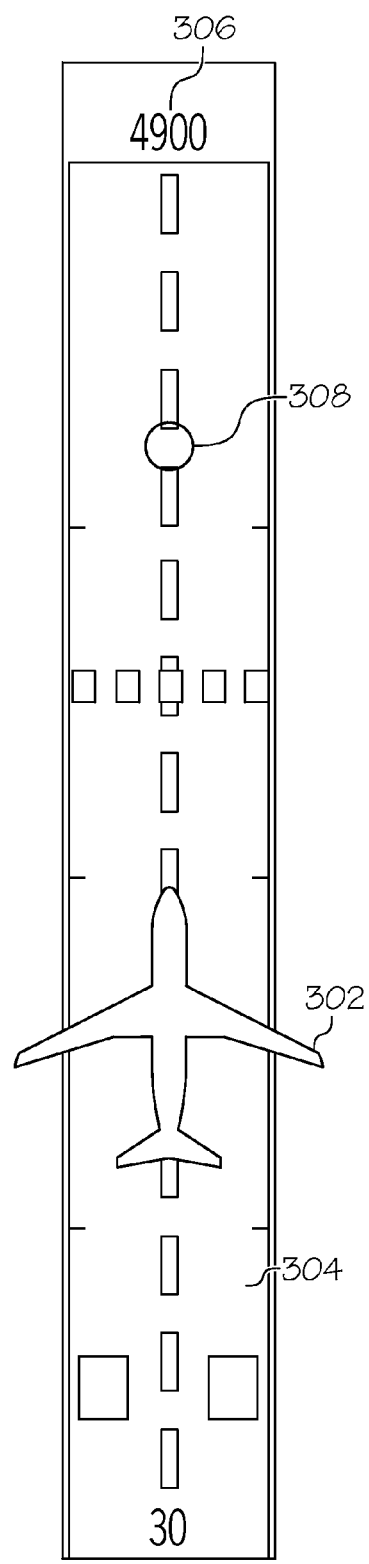

FIG. 5 depicts the symbology once the aircraft has touched down on the runway. Symbol 302 depicts the current position of the aircraft on the runway 304 and the number 306 at the end of the runway indicated the distance remaining to the end of the runway. Symbol 308 indicates the point on the runway were the aircraft will stop based on the current aircraft state and current aircraft stopping performance.

Figure 6:
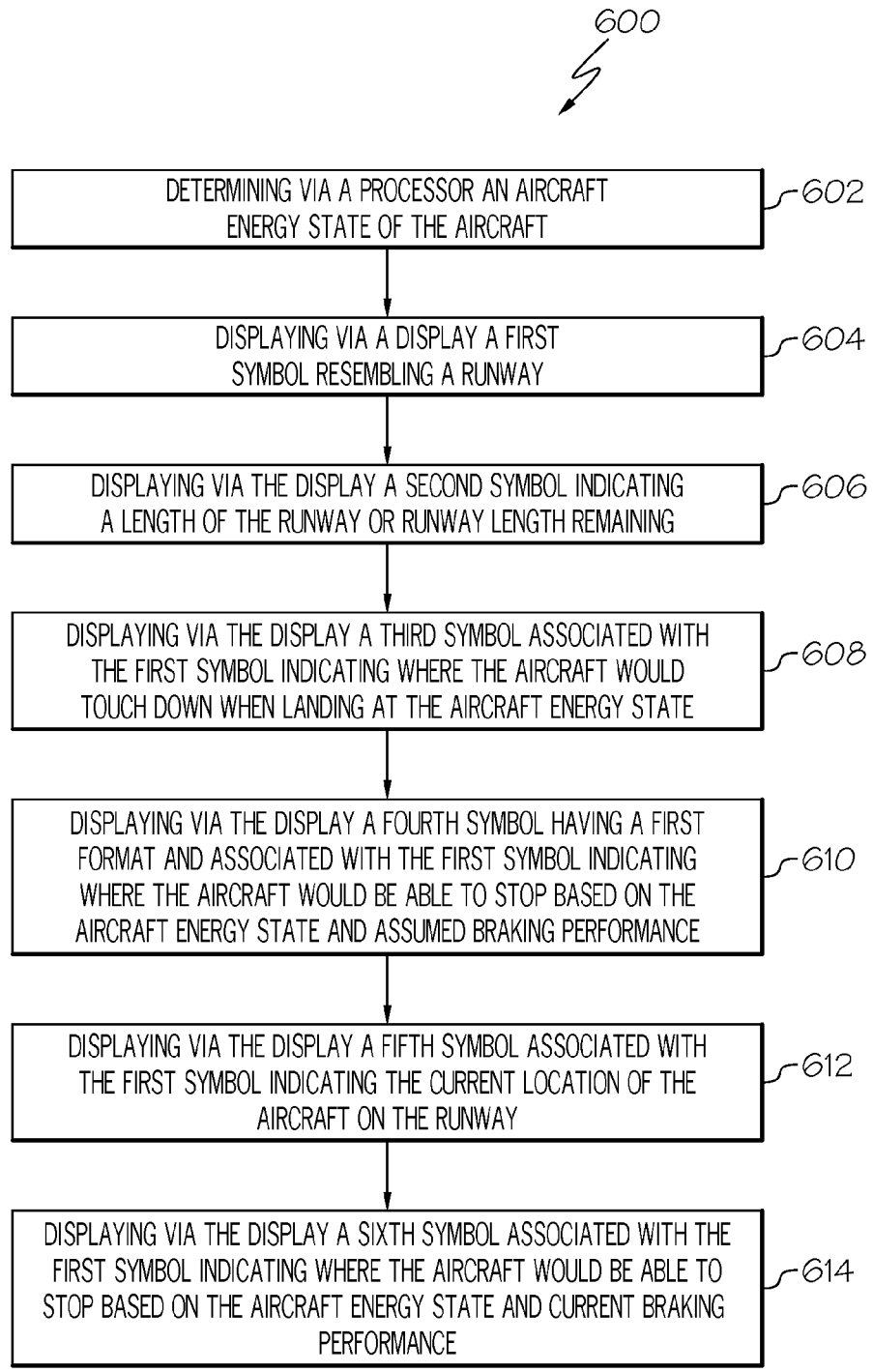
FIG. 6 a flow diagram of an exemplary method suitable for use with the display system of FIG. 1 in accordance with the exemplary embodiments.

FIG. 6 is a flow chart that illustrates an exemplary embodiment of a method 600 suitable for use with a flight deck display system 100. Method 600 represents one implementation of a method for displaying aircraft approaches or departures on an onboard display of a host aircraft. The various tasks performed in connection with method 600 may be performed by software, hardware, firmware, or any combination thereof. For illustrative purposes, the following description of method 600 may refer to elements mentioned above in connection with preceding FIGS. In practice, portions of method 600 may be performed by different elements of the described system, e.g., a processor, a display element, or a data communication component. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

In accordance with the exemplary method of FIG. 6, a method 600 method for assisting a pilot of an aircraft to fly a stable landing includes determining 602 via a processor an aircraft energy state of the aircraft; displaying 604 via a display a first symbol resembling a runway; displaying 606 via the display a second symbol indicating a length of the runway or runway length remaining; displaying 608 via the display a third symbol associated with the first symbol indicating where the aircraft would touch down when landing at the aircraft energy state; displaying 610 via the display a fourth symbol having a first format and associated with the first symbol indicating where the aircraft would be able to stop based on the aircraft energy state and assumed braking performance; displaying 612 via the display a fifth symbol associated with the first symbol indicating the current location of the aircraft on the runway; and displaying 614 via the display a sixth symbol associated with the first symbol indicating where the aircraft would be able to stop based on the aircraft energy state and current braking performance.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for assisting a pilot of an aircraft to perform a stable landing, the system comprising:
   a processor configured to:
      determine an aircraft energy state of the aircraft; and
   a display responsive to the processor and configured to:
      display a first symbol resembling a runway;
      display a second symbol indicating a length of the runway or runway length remaining;
      display a third symbol associated with the first symbol indicating where the aircraft would touch down when landing at the aircraft energy state determined by the processor;
      display a fourth symbol having a first format and associated with the first symbol indicating where the aircraft would be able to stop based on the aircraft energy state and assumed braking performance;
      change the fourth symbol to a second format when the fourth symbol is at an end of the runway; and
   if the aircraft is on the ground,
      display a fifth symbol associated with the first symbol indicating the current location of the aircraft on the runway; and
      display a sixth symbol associated with the first symbol indicating where the aircraft would be able to stop based on the aircraft energy state and current braking performance.

2. The system of claim 1 wherein the processor is further configured to:
   consider an airspeed, altitude, and distance to the runway of the aircraft when determining the aircraft energy state.

3. The system of claim 2 wherein the processor is further configured to:
   consider a configuration of the aircraft when determining the aircraft energy state.

4. The system of claim 1 wherein the processor is further configured to:
   change the fourth symbol to a third format when the aircraft would be unable to stop by the end of the runway.

5. The system of claim 1 further comprising an audio device, wherein the processor is further configured to:
   command the audio device to provide an audio alert that the aircraft would be unable to stop by the end of the runway.

6. The system of claim 1, wherein the processor is further configured to:

determine which of the second, third, fourth, fifth, or sixth symbol is most critical to current aircraft operations, wherein the second, third, fourth, fifth, or sixth symbols occupy layers of the display; and wherein the display is further configured to:
display the most critical symbol in the layer closest to the pilot.

7. A system for assisting a pilot of an aircraft to perform a stable landing, the system comprising:
a database configured to store information about a runway including a length thereof;
a processor coupled to the database and configured to:
determine an aircraft energy state of the aircraft;
determine a position of the aircraft in relation to the runway;
determine a stopping distance of the aircraft when landing on the runway based on the aircraft energy state and assumed braking performance;
determine a stopping distance of the aircraft when landing on the runway based on the aircraft energy state and current braking performance; and
a display responsive to the processor and configured to:
display a first symbol resembling the runway;
display a second symbol indicating the length of the runway or runway length remaining;
display a third symbol associated with the first symbol indicating where the aircraft would touch down when landing at the aircraft energy state determined by the processor;
display a fourth symbol having a first format and associated with the first symbol indicating where the aircraft would be able to stop based on the aircraft energy state and assumed braking performance;
display a fifth symbol associated with the first symbol indicating the current location of the aircraft on the runway;
display a sixth symbol associated with the first symbol indicating where the aircraft would be able to stop based on the aircraft energy state and current braking performance; and
change the fourth symbol to a second format when the fourth symbol is at an end of the runway.

8. The system of claim 7 wherein the processor is further configured to:
consider an airspeed, altitude, and distance to the runway of the aircraft when determining the aircraft energy state.

9. The system of claim 8 wherein the processor is further configured to:
consider a configuration of the aircraft when determining the aircraft energy state.

10. The system of claim 7 wherein the processor is further configured to:
change the fourth symbol to a third format when the aircraft would be unable to stop by the end of the runway.

11. The system of claim 7 further comprising an audio device, wherein the processor is further configured to:
command the audio device to provide an audio alert that the aircraft would be unable to stop by the end of the runway.

12. A method for assisting a pilot of an aircraft to fly a stable landing, comprising:
determining via a processor an aircraft energy state of the aircraft;
displaying via a display a first symbol resembling a runway;
displaying via the display a second symbol indicating a length of the runway or runway length remaining;
displaying via the display a third symbol associated with the first symbol indicating where the aircraft would touch down when landing at the aircraft energy state;
displaying via the display a fourth symbol having a first format and associated with the first symbol indicating where the aircraft would be able to stop based on the aircraft energy state and assumed braking performance;
displaying via the display a fifth symbol associated with the first symbol indicating the current location of the aircraft on the runway;
displaying via the display a sixth symbol associated with the first symbol indicating where the aircraft would be able to stop based on the aircraft energy state and current braking performance; and
changing via the processor the fourth symbol to a second format when the fourth symbol is at an end of the runway.

13. The method of claim 12 further comprising:
considering via the processor the airspeed, altitude, and distance to the runway when determining the aircraft energy state.

14. The method of claim 13 further comprising:
considering via the processor the configuration of the aircraft when determining the aircraft energy state.

15. The method of claim 12 further comprising:
changing via the processor the fourth symbol to a third format when the aircraft would be unable to stop by the end of the runway.

16. The method of claim 12 further comprising:
commanding via the processor an audio device to provide an audio alert that an approach of the aircraft is unstable exceeds a threshold related to the stopping distance of the aircraft.

17. The method of claim 12 further comprising:
determining which of the second, third, fourth, fifth, or sixth symbol is most critical to current aircraft operations, wherein the second, third, fourth, fifth, or sixth symbols occupy layers of the display; and
displaying the most critical symbol in the layer closest to the pilot.

* * * * *